(12) United States Patent
Regan

(10) Patent No.: US 9,708,017 B1
(45) Date of Patent: Jul. 18, 2017

(54) VEHICLE AERODYNAMIC IMPROVEMENT APPARATUS AND SYSTEM

(71) Applicant: Rocketail, LLC, Del Mar, CA (US)

(72) Inventor: Jesse Regan, Denver, CO (US)

(73) Assignee: Rocketail, LLC, Del Mar, CA (US)

( * ) Notice: Subject to any disclaimer, the term of this patent is extended or adjusted under 35 U.S.C. 154(b) by 0 days.

(21) Appl. No.: 15/093,733

(22) Filed: Apr. 7, 2016

(51) Int. Cl.
*B62D 35/00* (2006.01)
*B62D 37/02* (2006.01)

(52) U.S. Cl.
CPC ........... *B62D 35/002* (2013.01); *B62D 37/02* (2013.01)

(58) Field of Classification Search
CPC .............................. B62D 35/002; B62D 37/02
USPC .......... 296/180.4, 180.1, 180.2, 180.3, 180.5
See application file for complete search history.

(56) References Cited

U.S. PATENT DOCUMENTS

| | | |
|---|---|---|
| 3,960,402 A | 6/1976 | Keck |
| 4,320,920 A | 3/1982 | Goudey |
| 6,257,654 B1 | 7/2001 | Boivin et al. |
| 6,485,087 B1 | 11/2002 | Roberge et al. |
| 6,959,958 B2 | 11/2005 | Basford |
| 7,641,262 B2 | 1/2010 | Nusbaum |
| 7,950,720 B2 | 5/2011 | Skopic |
| 8,196,995 B2 | 6/2012 | Chen |
| 8,382,194 B2 | 2/2013 | Wood |
| 8,672,391 B1 * | 3/2014 | Cobb ................... B62D 35/001 296/180.4 |
| 9,199,673 B2 | 12/2015 | Baker |
| 2014/0319872 A1 * | 10/2014 | Kunkel ................ B62D 35/001 296/180.4 |
| 2015/0097393 A1 | 4/2015 | Dieckmann et al. |

OTHER PUBLICATIONS

Davis, et al., 2014 Vehicle Technologies Market Report, Report, 2014, 6th edition, Oak Ridge National Laboratory.

* cited by examiner

*Primary Examiner* — Joseph D Pape
*Assistant Examiner* — Dana Ivey
(74) *Attorney, Agent, or Firm* — Procopio, Cory, Hargreaves & Savitch LLP

(57) ABSTRACT

An apparatus for the improvement of the aerodynamic properties of a primary vehicle or the aerodynamic properties of a secondary vehicle, such as a trailer, towed by a primary vehicle. Certain embodiments of the invention include an apparatus and a system typically mounted to a rear-ward portion of a semi-trailer for aerodynamic improvement. Certain embodiments of the invention include an airfoil and a stabilizer interconnected by a series of stiffeners spanning between them creating apertures for interaction with air-flow surrounding the trailing edge of a vehicle.

10 Claims, 12 Drawing Sheets

VEHICLE AERODYNAMIC IMPROVEMENT APPARATUS AND SYSTEM

FIELD OF THE INVENTION

The present invention surrounds an apparatus and system for the improvement of aerodynamics of a primary vehicle or a secondary vehicle towed by a primary vehicle.

BACKGROUND

Despite advances in technology providing more fuel-efficient power generation for vehicles, efforts continue to strive for a more efficient vehicle overall. A large factor in vehicle efficiency lies in the aerodynamics of the vehicle. While the design of smaller road-going passenger vehicles adapts through continuous design revisions between model years, the road-going truck market, particularly the long-haul or Class 8 segment of the market has not been able to adapt as quickly. Also referred to as a "semi-truck" or "semi," long-haul trucks transport mass quantities of goods through the use of trailers sometimes in excess of 50 feet in length and 60,000 pounds of payload capacity. The modern semi-truck trailer has undergone little design improvement for aerodynamic efficiency over several decades. Furthermore, the average fuel economy of a road-going semi-truck towing a loaded trailer is only 7.2 miles per gallon (Davis, Stacy C. 2014 *Vehicle Technologies Report*. Oakridge, Tenn.: U.S. Dept. of Energy, 2014. ORNL/TM-2015/85). There are currently over 5.6 million semi-trailers registered for use in the United States alone. The lifespan of an average semi-trailer typically spans 12-15 years, as such the immediate redesign of the standard semi-trailer will do little to improve overall efficiency in the near-term. As a result, there is a need for a near-term solution that improves aerodynamic efficiency of semi-trailers in a cost-efficient manner.

Aerodynamic drag is a primary contributing factor to fuel consumption when operating a road-going truck and trailer at highway speeds. Friction drag and pressure drag are two variables surrounding aerodynamic drag. Friction drag surrounds the interaction of the ambient air and the surface of the trailer as it moves through it. However, the effects of friction drag are limited in comparative nature to pressure drag when considering a semi-trailer. Pressure drag is a dominant acting variable in the aerodynamic consideration of a semi-trailer. Pressure drag is caused by large pressure differentials in the wake of a trailer due to rapid flow separation creating turbulent flow characteristics. Turbulent flow characteristics can create such phenomena as a Kaman vortex street, which is a repeating pattern of swirling vortices caused by the unsteady separation of flow of a fluid around blunt bodies. Such turbulent characteristics cause inefficient aerodynamic flow, due to increased pressure drag, and may even create unsafe oscillation of the trailer. In extreme cases this can result in destabilization and tip-over of the trailer and the primary vehicle.

SUMMARY OF THE INVENTION

Efforts to improve aerodynamics of a vehicle such as a semi-trailer by addressing the aft end of the vehicle typically surrounds the improvement of flow separation to provide a more laminar and consistent flow further aft of the vehicle so as to prevent large pressure differentials which may cause eddy formation, vortices or other inefficient flow dynamics. In the improvement of the aerodynamics of a vehicle, it will be appreciated that the convergence of flow, post separation, is desired to converge quickly and with decreased turbulent flow characteristics.

The present invention relates to an apparatus for the improvement of the aerodynamic properties of a primary vehicle or the aerodynamic properties of a secondary vehicle, such as a trailer, towed by a primary vehicle. Examples of a primary vehicle include a semi-truck and examples of a secondary vehicle include a semi-trailer. As disclosed herein the invention typically surrounds embodiments of the invention as applied to a semi-trailer towed by a road-going semi-truck. However, it will be appreciated that the invention as disclosed herein may be applied to different primary or secondary vehicles in alternate configurations to improve aerodynamic properties of the vehicle as applied.

Current devices try to improve the aerodynamics of a semi-trailer by attempting to equalize pressure differentials from the aft portion of the semi-trailer. Others try to equalize the rapid and turbulent flow separation from the aft portion of a semi-trailer. In order to do so, current devices redirect the airflow through the use of deflectors or scoop forms. These deflectors try to equalize airflow pressure of the air that flows along the sides of the trailer with airflow pressure of the air that flows immediately aft of the trailer when in motion. Examples of such devices include U.S. Pat. No. 3,960,402 to Keck, U.S. Pat. No. 4,320,920 to Goudey, U.S. Pat. No. 7,950,720 to Skopic, and U.S. Pat. No. 8,196,995 to Chen; all of which are herein incorporated in their entirety by reference. While these references disclose providing a level of pressure differential equalization between the laminar flow prior to an aft plane of a semi-trailer, the aerodynamic drag created by such solutions minimize or negate aerodynamic benefits gained through such equalization. It will be appreciated that the aft plane is typically associated with the rear-most plane of a semi-trailer perpendicular to the path of travel.

Other devices attempt to improve the aerodynamics of a semi-trailer by equalizing pressure differentials by providing planar forms that extend past the aft-plane of a semi-trailer. Other devices attempt to improve aerodynamics by using planar forms that extend past the aft-plane of a semi-trailer to equalize the rapid and turbulent flow separation from the aft portion of a semi-trailer. Examples of such devices include U.S. Pat. No. 6,257,654 ("the '654 Patent") to Boivin, et al., U.S. Pat. No. 6,485,087 ("the '087 Patent") to Roberge, et al., U.S. Pat. No. 6,959,958 ("the '958 Patent") to Basford, U.S. Pat. No. 8,382,194 ("the '194 Patent") to Wood, and U.S. Pat. No. 9,199,673 ("the '673 Patent") to Baker; all of which are herein incorporated in full by reference. These devices, such as the '654 Patent, require up to 1.21 m (4 foot) extension from the aft-plane to provide optimal mitigation of pressure differentials. The same length of extension is also required to mitigate the rapid and turbulent flow separation from the aft portion of a semi-trailer. Indeed, the '654 Patent sometimes requires the use of a third top-mounted planar form. Importantly, using shorter lengths of these planar shaped extensions reduce the aerodynamic benefits, thus teaching away from reducing the size of the extension in order to achieve the desired aerodynamic benefit. Moreover, needing a 1.21 m (4 foot) extension from the aft-plane increases the potential for damage the planar forms. Other devices, such as the '673 Patent, propose collapsing the planar forms. However, collapsing devices are costly, unreliable and difficult to install.

Other devices attempt to improve the aerodynamics of a semi-trailer by using wing-like forms to equalize the pressure differentials. Other devices use curved panels to direct airflow to equalize pressure differentials. These devices, whether wing-like forms or curved panels, are also used to address the rapid and turbulent flow separation from the aft portion of a semi-trailer. These devices are installed offset from the sides a semi-trailer proximate to the aft-plane, to provide pressure equalization and minimize rapid and turbulent airflow separation from the aft portion of a semi-trailer. Examples of such devices include U.S. Pat. No. 3,960,402 ("the '402 Patent") to Keck, U.S. Pat. No. 7,641,262 ("the '262 Patent") to Nusbaum, and U.S. Pat. No. 7,950,720 ("the '720 Patent") to Skopic; all of which are herein incorporated in their entirety by reference. These devices, however, increase the risk of colliding with static structures and other vehicles, as the offset from the side and/or top surfaces of the semi-trailer increases the width profile of the trailer. Furthermore, the increased width of the trailer added by these devices may violate the width limitations dictated by the Department of Transportation.

Certain embodiments of the present invention comprise an aerodynamic device intended for use in contact with a trailing vertical edge of an aft-plane of a vehicle. The aerodynamic device has an aperture allowing the redirection of airflow. The redirection of airflow mitigates pressure differentials. The redirection of airflow also mitigates the rapid and turbulent flow separation from the aft portion of a semi-trailer. Other embodiments have a plurality of apertures. Other embodiments have a singular aperture segmented by at least one stiffener. The stiffener or stiffeners are typically axially oriented parallel to the direction of intended airflow.

Certain embodiments of the present invention improve the aerodynamics by having an aerodynamic device with apertures. The aerodynamic device has an airfoil, and a stabilizer. In certain embodiments, the airfoil is located proximate to the aperture leading edge, and the stabilizer is located proximate to the aperture trailing edge. It will be appreciated that other embodiments may be configured where the airfoil is proximate to the trailing edge of the aperture and the stabilizer proximate to the aperture leading edge.

Certain embodiments of the present invention comprise a system for the improving the aerodynamics of a vehicle. In certain embodiments, the system has at least two aerodynamic devices. One aerodynamic device is attached on one side of the vehicle and the other aerodynamic device is attached to the other side of the vehicle. A leading edge of one aerodynamic device is affixed to the left vertical edge of an aft-plane of a vehicle. A leading edge of a second aerodynamic device is affixed to the right vertical edge of the aft-plane of a vehicle. Attaching the aerodynamic devices mitigate the pressure differentials. Attaching the aerodynamic devices also mitigates the rapid and turbulent flow separation from the aft portion of the vehicle. In certain embodiments, the aerodynamic devices are affixed using a hinge mechanism. In certain embodiments, the default configuration of the aerodynamic devices is extending rearward from the aft-plane of the vehicle. The hinged attachment allows the aerodynamic device to pivot when a door is opened. The hinge mechanism of the system also allows for a user to pivot an aerodynamic device inward to rest in contact with the aft-plane such as the surface of a closed rear-door of a semi-trailer. It will be appreciated that the aft-plane of a vehicle, refers to a vertical plane at the rearmost portion of a vehicle body.

DETAILED DESCRIPTION OF CERTAIN EMBODIMENTS

The present disclosure surrounds an apparatus and system for the aerodynamic improvement of a vehicle, typically surrounding airflow near a rear-ward portion of the vehicle. Embodiments of the present disclosure describe an apparatus and a system typically mounted to a rear-ward portion of a semi-trailer for aerodynamic improvement. The aerodynamic improvements as applied mitigate inefficient aerodynamic phenomena. Such aerodynamic phenomena may include but is not limited to: Kaman vortex street, rapid flow separation and turbulent flow characteristics.

Figure 1:
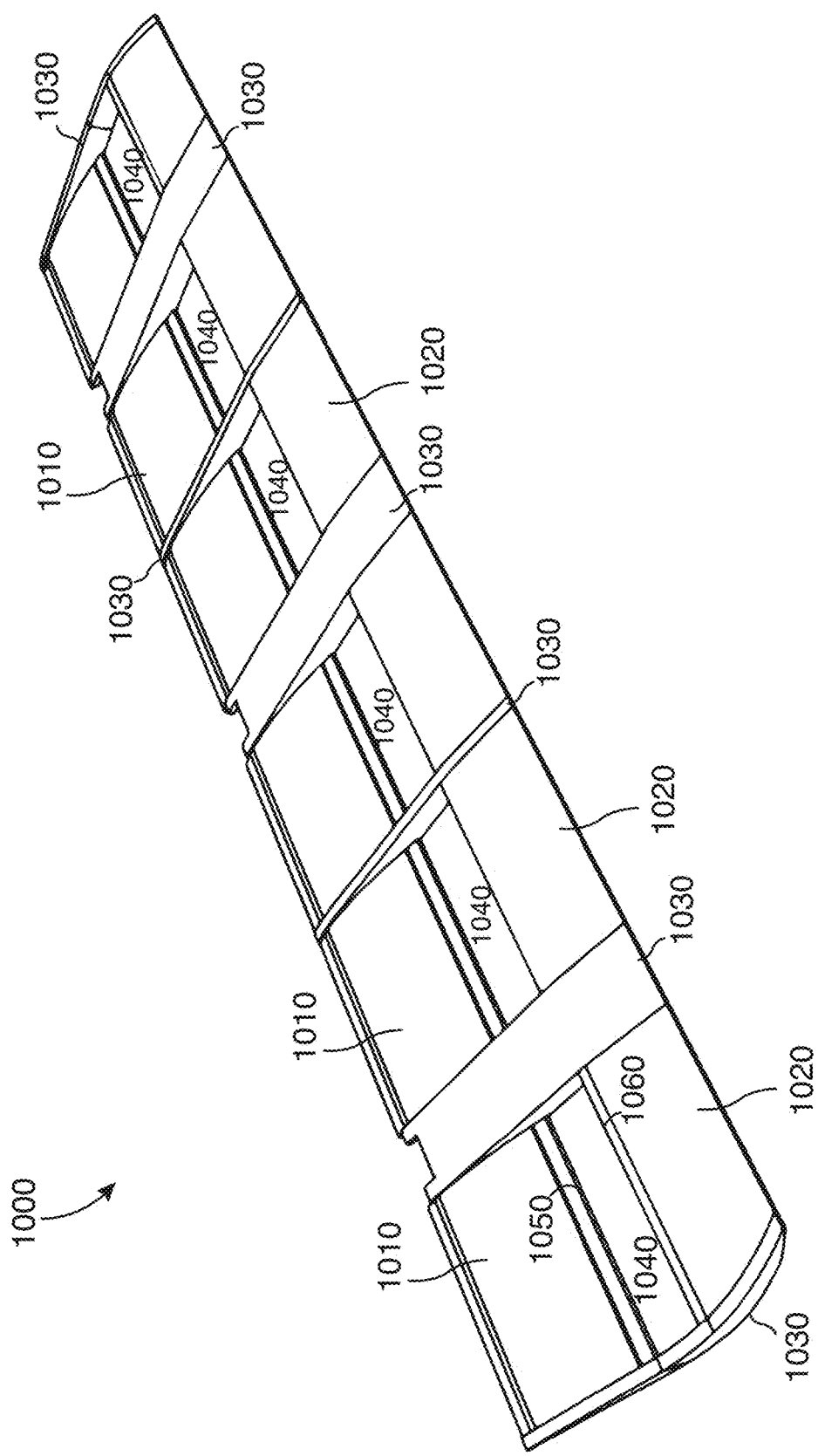
FIG. 1. Perspective view of an outward face of a planar form in certain embodiments.

An apparatus, as shown in FIG. 1 comprises an aerodynamic device 1000 further comprising an airfoil 1010 and a stabilizer 1020 interconnected by a series of stiffeners 1030 spanning between them. The apparatus further comprises a plurality of apertures 1040 defined by a trailing edge 1050 of the airfoil 1010, a leading edge 1060 of a stabilizer 1020, and two stiffeners 1030.

Figure 2:
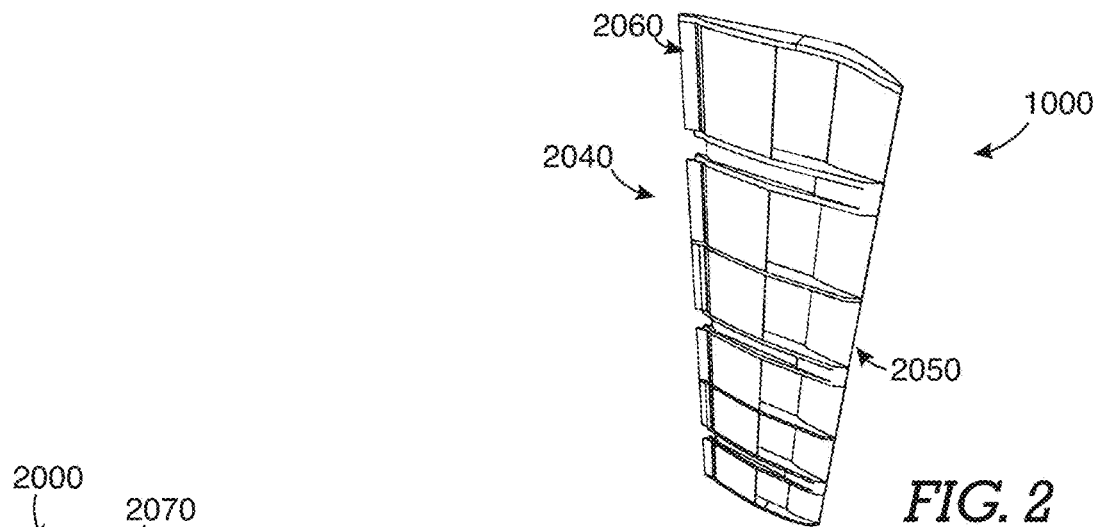
FIG. 2. Perspective view of an inward face of a planar form in certain embodiments.
Figure 3:
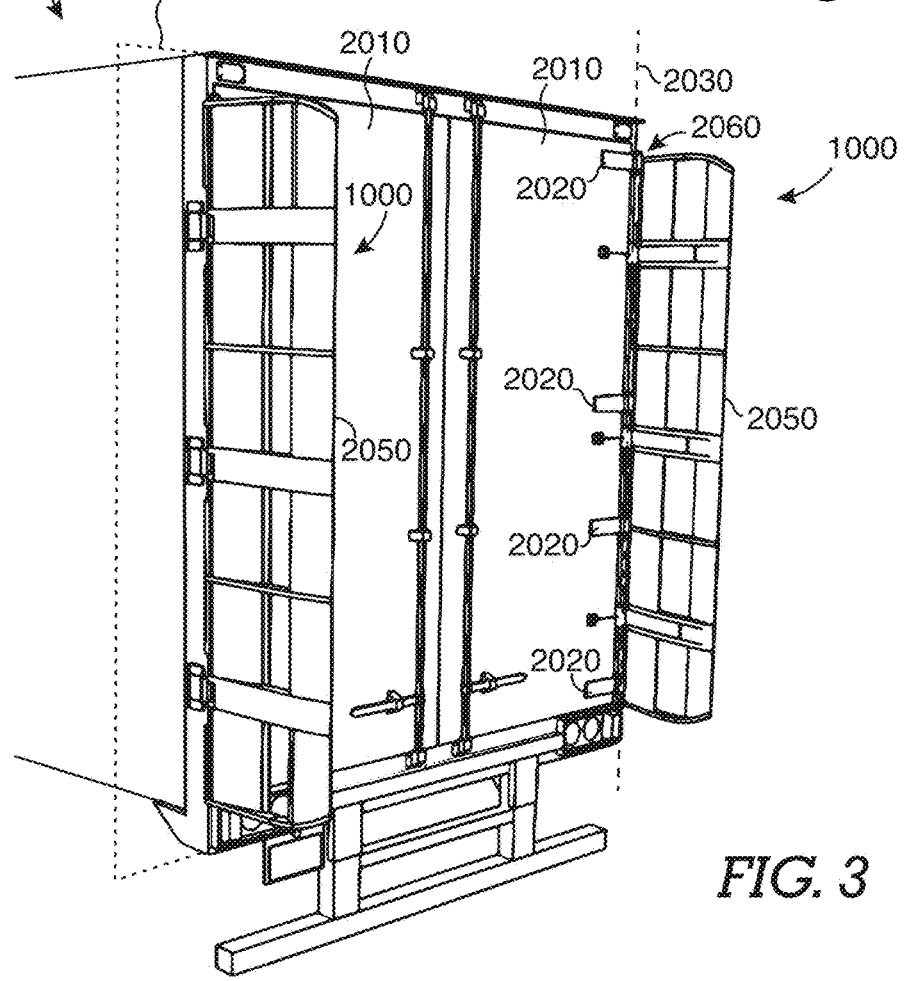
FIG. 3. Perspective view of a planar forms attached to a vehicle in certain embodiments.
Figure 4:
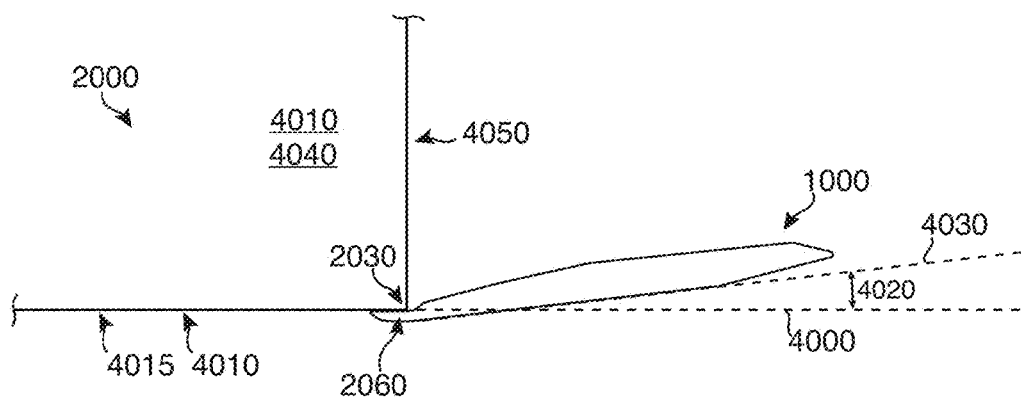
FIG. 4. Top view of a planar form attached to a trailing edge of a vehicle in certain embodiments.

Certain embodiments of an apparatus, as shown in FIG. 2 and FIG. 3 comprise an aerodynamic device 1000 having a leading edge 2040 and a trailing edge 2050. The aerodynamic device 1000, referring to FIG. 2, further comprises an edge-recess 2060 near the aerodynamic device leading edge 2040. Referring to FIG. 4, the edge-recess 2060 of certain embodiments is configured to mate with a vertical trailing edge 2030 of a vehicle 2000. Referring to FIG. 3, it will be appreciated that certain vehicles 2000 have door hinges 2020 associated with doors 2010 coincident with an aft-plane 2070. Referring again to FIG. 3, an edge-recess 2060 of an aerodynamic device 1000 is configured to provide clearance between the aerodynamic device 1000 and a door hinge 2020 proximate to the trailing edge 2030 of a vehicle 2000.

In certain embodiments as shown in FIG. 4, an apparatus for the aerodynamic improvement of a vehicle comprising an aerodynamic device 1000 is mated to a vertical trailing edge 2030 of a vehicle 2000 disposed at a device offset angle 4020 from a reference plane 4000.

In certain embodiments, a reference plane 4000 is coincident with an external planar surface 4010 of a vehicle 2000. The reference plane 4000 in the context of a semi-trailer is coincident with an external planar surface 4010 of the semi-trailer, such as a side-surface 4015 or top surface 4040. It may be desired to attach the aerodynamic device 1000 to the vertical trailing edge 2030 of the vehicle 2000 with the aerodynamic device 1000 directed inward toward the vehicle. It may be further desired to direct the aerodynamic device 1000 inward toward the vehicle at a device offset angle 4020 of 7-degrees inward from a reference plane 4000.

Figure 5A:
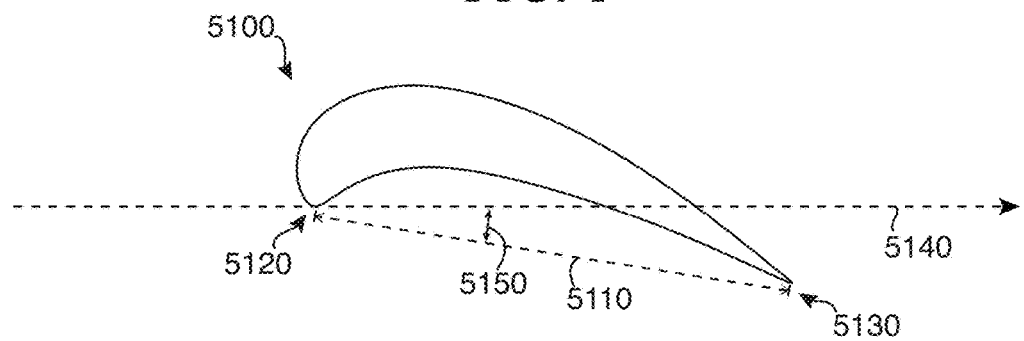
FIG. 5A. A typical air-foil.

As shown in FIG. 5A, it will be appreciated by those skilled in the art that a chord 5110, as used in reference to an aerodynamic form 5100, refers to a measurement aligned with the flow profile of the aerodynamic form 5100. The chord 5110 spans from a leading edge 5120 to a trailing edge 5130 of the aerodynamic form 5100. The angle of attack 5150 will be appreciated by those skilled in the art as indicating an angle between the general airflow 5140, also referred to as relative wind, and the chord 5010. In certain embodiments discussed herein, the airflow 5140 is parallel to a reference plane of a vehicle.

Figure 5B:
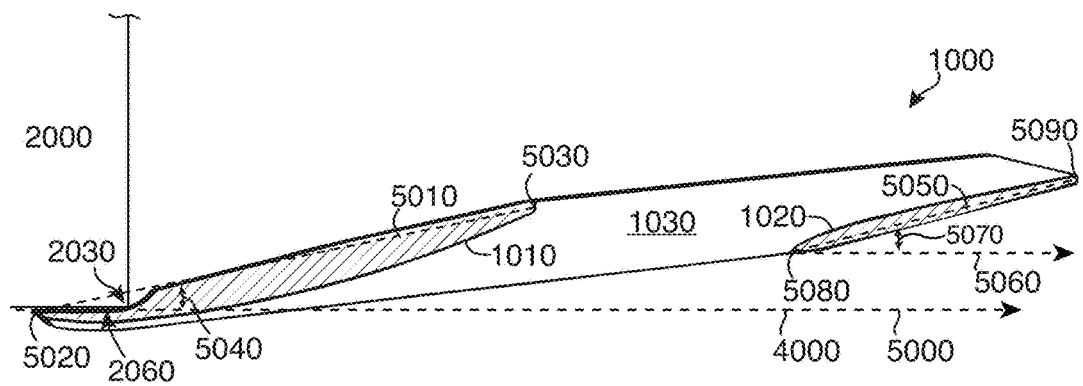
FIG. 5B. A cross-sectional view of an air foil form and a stabilizer component of a planar form in certain embodiments.

Certain embodiments, referring to FIG. 5B, comprises an aerodynamic device 1000 further comprising an airfoil 1010, a stabilizer 1020, a stiffener 1030 and an edge-recess 2060. The airfoil 1010 has an airfoil chord 5010 spanning from an airfoil leading edge 5020 to an airfoil trailing edge 5030. The stabilizer 1020 has a stabilizer chord 5050 spanning from a stabilizer leading edge 5080 to a stabilizer trailing edge 5090. In such embodiments the edge-recess 2060 is configured to interface with a trailing vertical edge 2030 of a vehicle 2000. With the edge-recess 2060 remaining parallel to a reference plane 4000 of the vehicle 2000, the airfoil angle of attack 5040 and stabilizer angle of attack 5070 may be disposed at an angle greater than zero. It may also be desired for the airfoil angle of attack 5040 and stabilizer angle of attack 5070 to be set at different values. It may be further desired to have the stabilizer leading edge 5080 offset laterally inward from the reference plane 4000.

Figure 6:
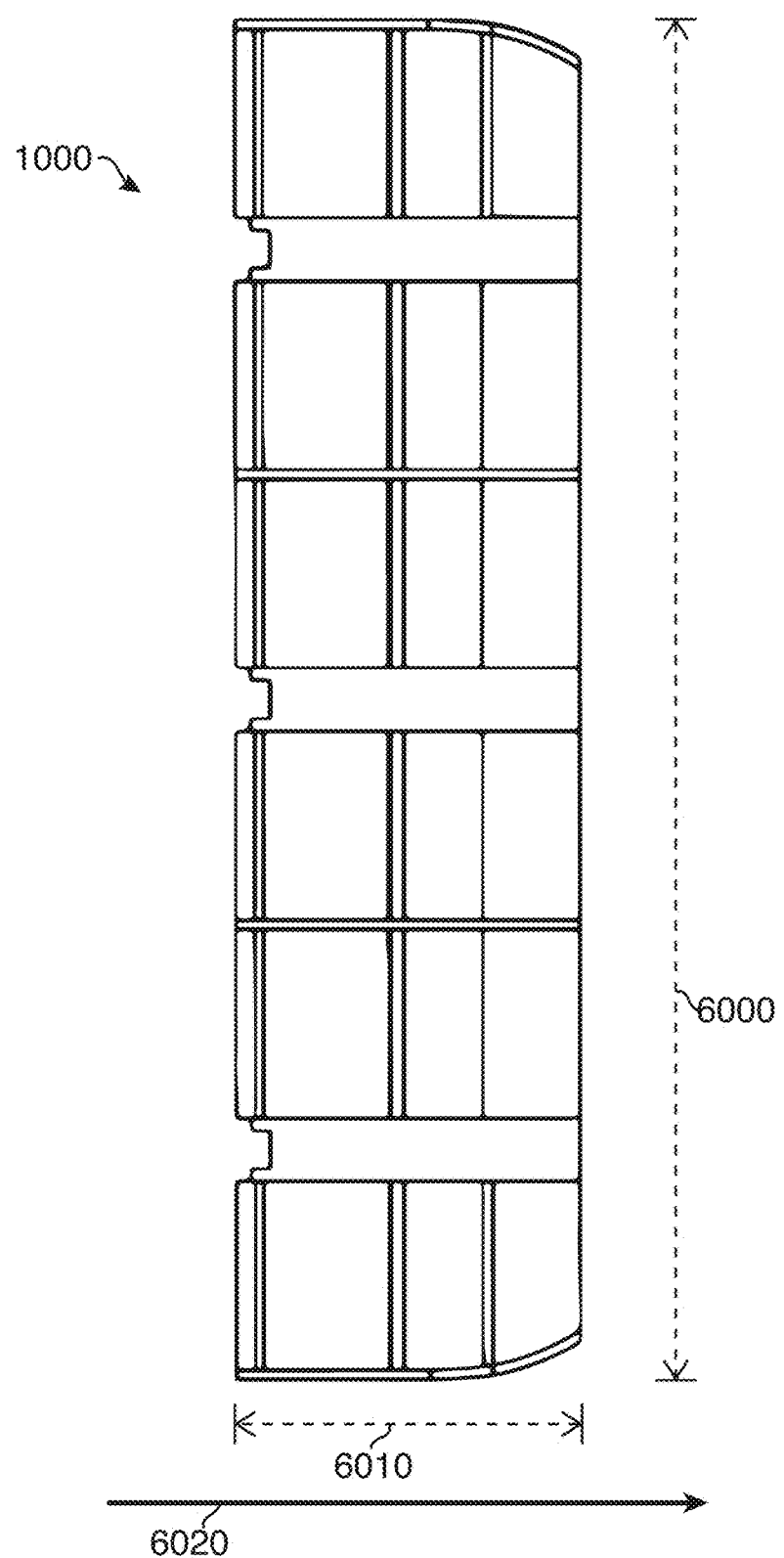
FIG. 6. Plan view of a planar form in certain embodiments.

In certain embodiments, as shown in FIG. 6, for the aerodynamic improvement of a vehicle further comprising an aerodynamic device 1000 is configured for fixation proximal to a trailing vertical edge of a semi-trailer. In a variation of such embodiments, the length 6000 of the aerodynamic device, spans 271.7 cm (107 inches) and the width 6010 spans 68.6 cm (27 inches). In such embodiments, the width of the aerodynamic device or portion thereof extends rearward, in the direction of general airflow 6020 and away from the semi-trailer.

Figure 7A:
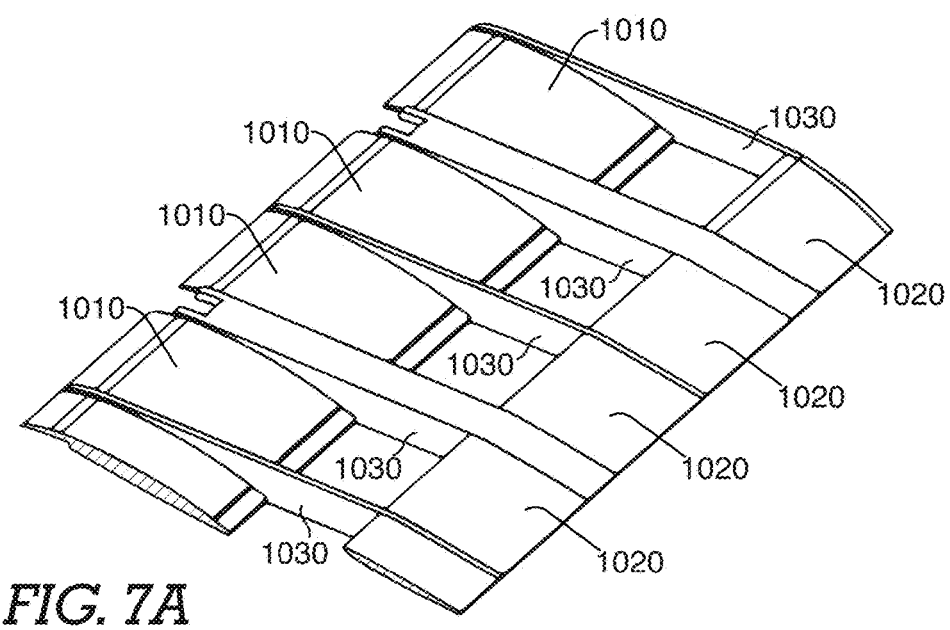
FIG. 7A. Perspective cross-sectional view of a planar form in certain embodiments.
Figure 7B:
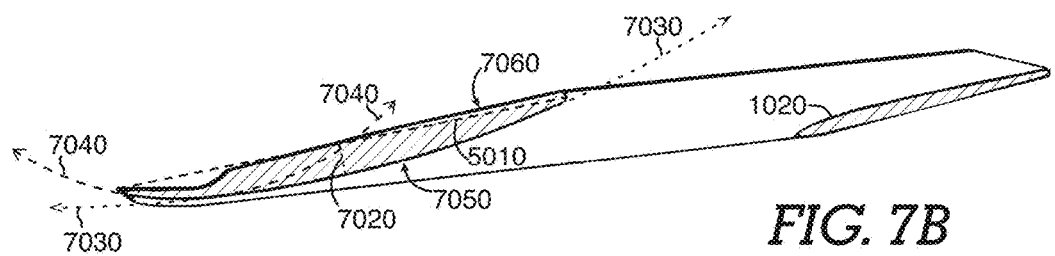
FIG. 7B. A cross-sectional view of a planar form in certain embodiments.

Certain embodiments of an apparatus comprising an aerodynamic device 1000, as shown in FIG. 7A, further comprises an airfoil 1010 in coordination with a stabilizer 1020 interconnected by a plurality of stiffeners 1030. Referring to FIG. 7B, an airfoil 1010 has a chord length 5010 of 33.8 cm (13.3 inches) and a maximum thickness 7020 of approximately 2.5 cm (1 inch). The airfoil 1010 has an airfoil primary surface 7050 as defined by an airfoil leading arc 7040 of radius of 61 cm (24 inches) coincident with the airfoil leading edge 2040. The airfoil primary surface is further defined by an airfoil trailing arc 7030 of radius of 121.9 cm (48 inches), such that the airfoil trailing arc 7030 is coincident with the airfoil trailing edge 5030 and tangential to the airfoil leading arc 7040. In certain embodiments, an airfoil 1010 has a substantially planar secondary airfoil surface 7060. In such embodiments, the airfoil angle of attack 5040 is 11.5-degrees from a reference line defined by the edge recess 2060 configured to interface with a reference plane 4000 of a vehicle 2000 as shown in FIG. 5B. In such embodiments, referring to FIG. 7C, the airfoil 1010 leading edge 2040 is coincident with the aerodynamic device leading edge 2040.

Figure 7C:
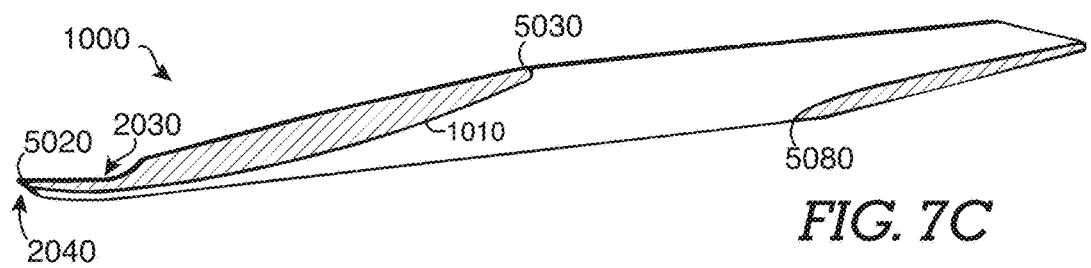
FIG. 7C. A cross-sectional view of a planar form in certain embodiments.
Figure 7D:
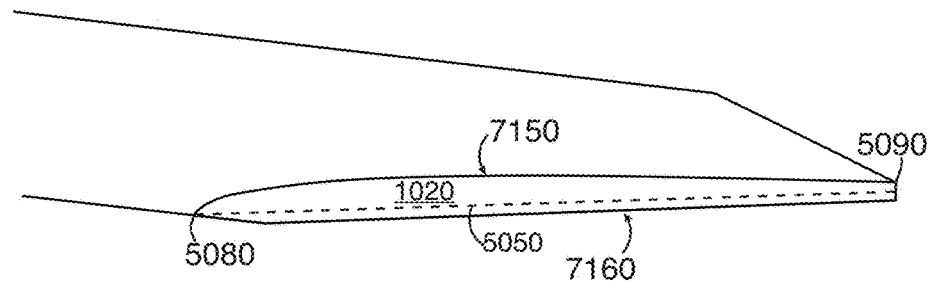
FIG. 7D. A cross-sectional magnified view of a stabilizer component of a planar form in certain embodiments.
Figure 7E:
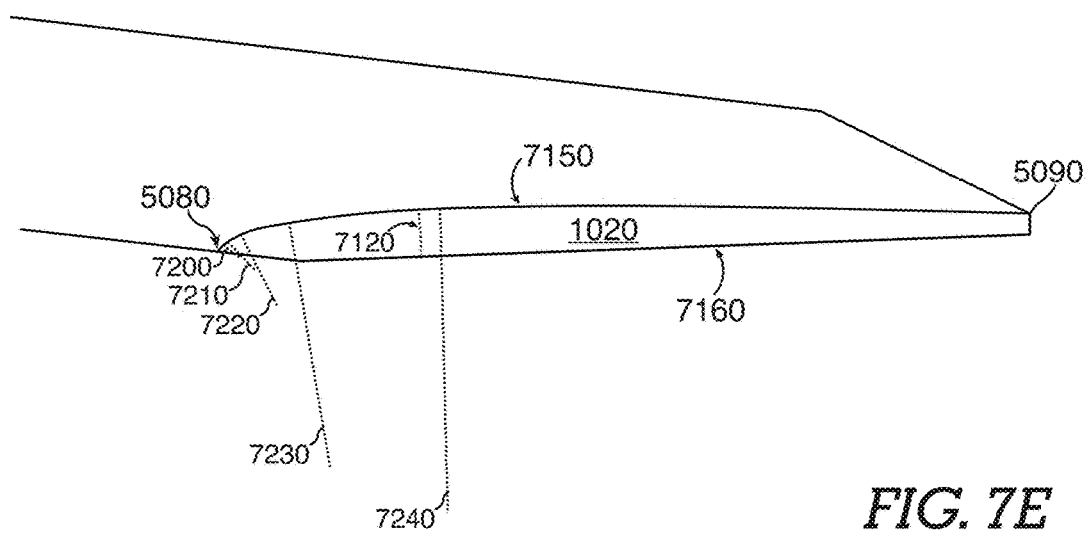
FIG. 7E. A cross-sectional magnified view of a stabilizer component of a planar form in certain embodiments.

Referring to FIG. 7D and FIG. 7E, certain embodiments of a stabilizer 1020 has a primary stabilizer surface 7150 and a substantially planar secondary stabilizer surface 7160. In such embodiments, a stabilizer 1020 has stabilizer chord 5050 of length 19.4 cm (7.62 inches) and a stabilizer maximum thickness 7120 of 1.27 cm (0.5 inch). A primary stabilizer airflow surface 7150 is defined by a stabilizer leading edge 5080 with a 0.51 cm (0.2 inch) leading edge arc 7200 connected to a series of tangentially interconnected arcs spanning from the stabilizer leading edge 5080 to the stabilizer trailing edge 5090. Following the leading edge arc 7200 is a first stabilizer arc 7210 of 1.0 cm (0.4 inch), then a second stabilizer arc 7220 of 1.9 cm (0.75 inch), a third stabilizer arc 7230 of 7.62 cm (3 inches), and a fourth stabilizer arc 7240 of 88.9 cm (35 inches) extending to a stabilizer trailing edge 5090. The stabilizer trailing edge 5090 of such embodiments has a thickness 1.0 cm (0.4 inch).

Figure 7F:
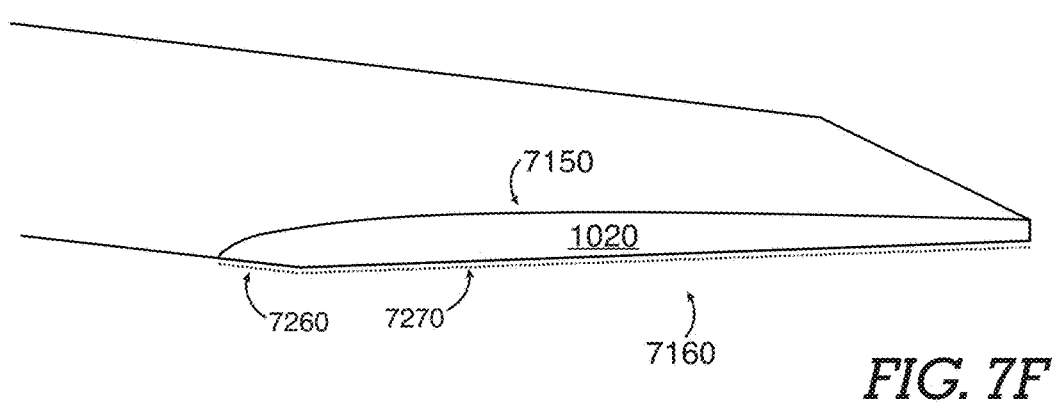
FIG. 7F. A cross-sectional magnified view of a stabilizer component of a planar form in certain embodiments.

Referring to FIG. 7F, in certain embodiments, the secondary stabilizer surface 7160 comprises two planar segments having a first planar segment 7260 of 1.9 cm (0.75 inch) and a second planar segment 7270 of 17.2 cm (6.8 inches). In certain embodiments, as shown in FIG. 7c, the stabilizer is disposed such that the stabilizer leading edge 5080 is 49.5 cm (19.5 inches) laterally from the airfoil leading edge 2040 and offset 3.6 cm (1.4 inches) from the edge recess 2030. In such embodiments, the angle of attack of the stabilizer is disposed at an angle of 14-degrees from the reference line.

It will be appreciated to those skilled in the art that the form, angle of attack, size and location of an airfoil and a stabilizer may vary between vehicle applications, intended speed of vehicle and general environment in which the vehicle operates in based on aerodynamic optimization practices.

Figure 8:
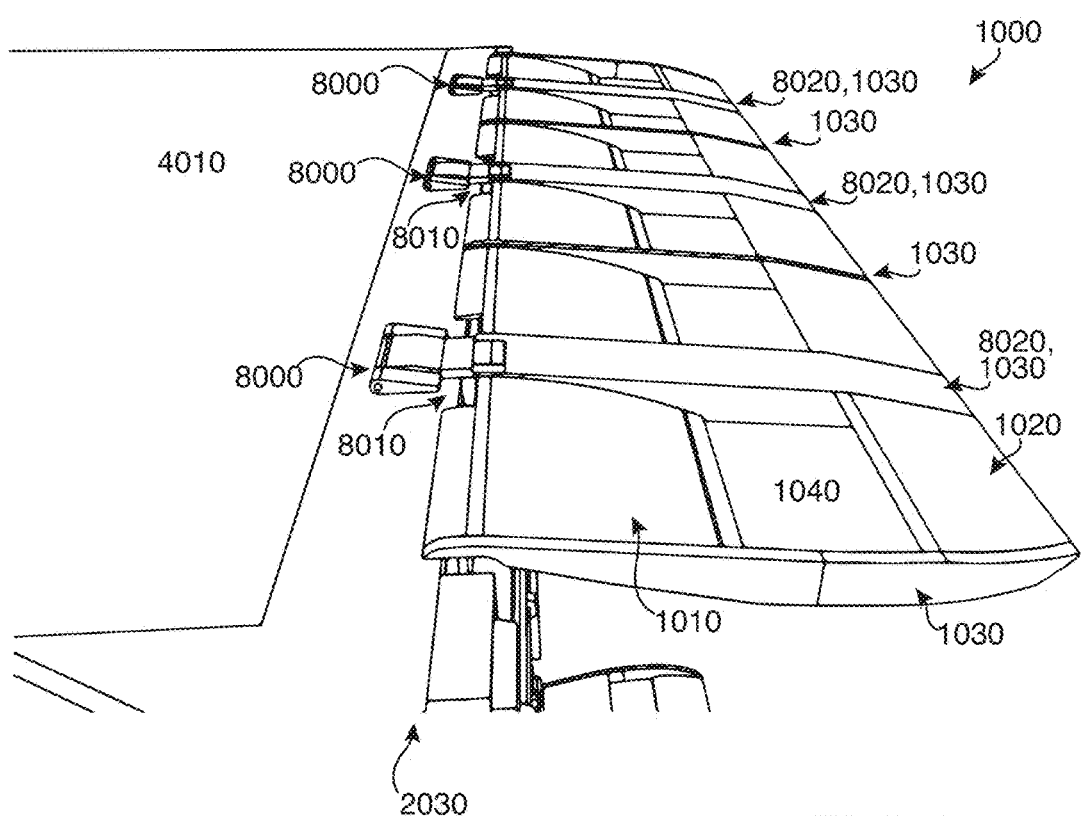
FIG. 8. Bottom perspective view of a planar form attached to a vehicle in certain embodiments.

An apparatus, as shown in FIG. 8, comprising an aerodynamic device 1000 with stiffeners 1030, an airfoil 1010 and stabilizer 1020. In such an embodiment, a stiffener 1030 further comprises a mounting stiffener 8020. Mounting stiffeners 8020 are configured to affix to the vertical trailing edge 2030 of a vehicle using a hinged mount 8000 affixed to a vertical trailing edge 2030 of a vehicle 2000.

Figure 9A:
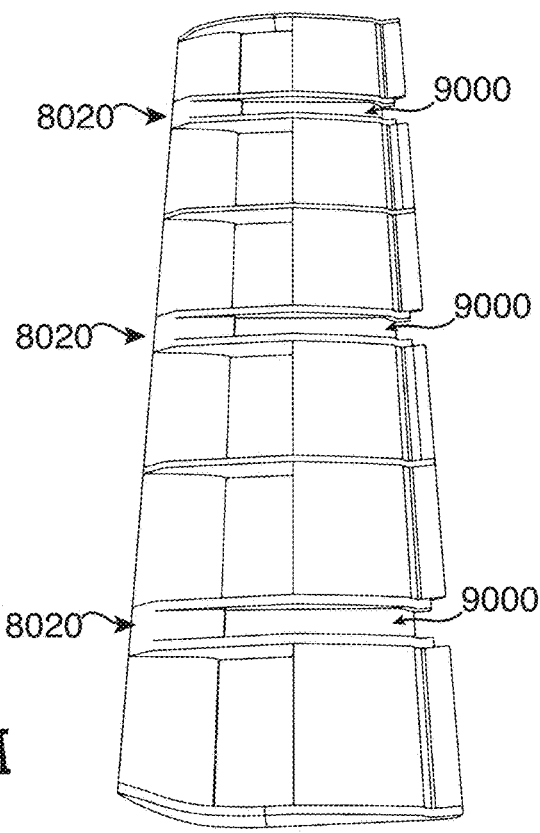
FIG. 9A. Perspective view of an inward face of a planar form in certain embodiments.
Figure 9B:
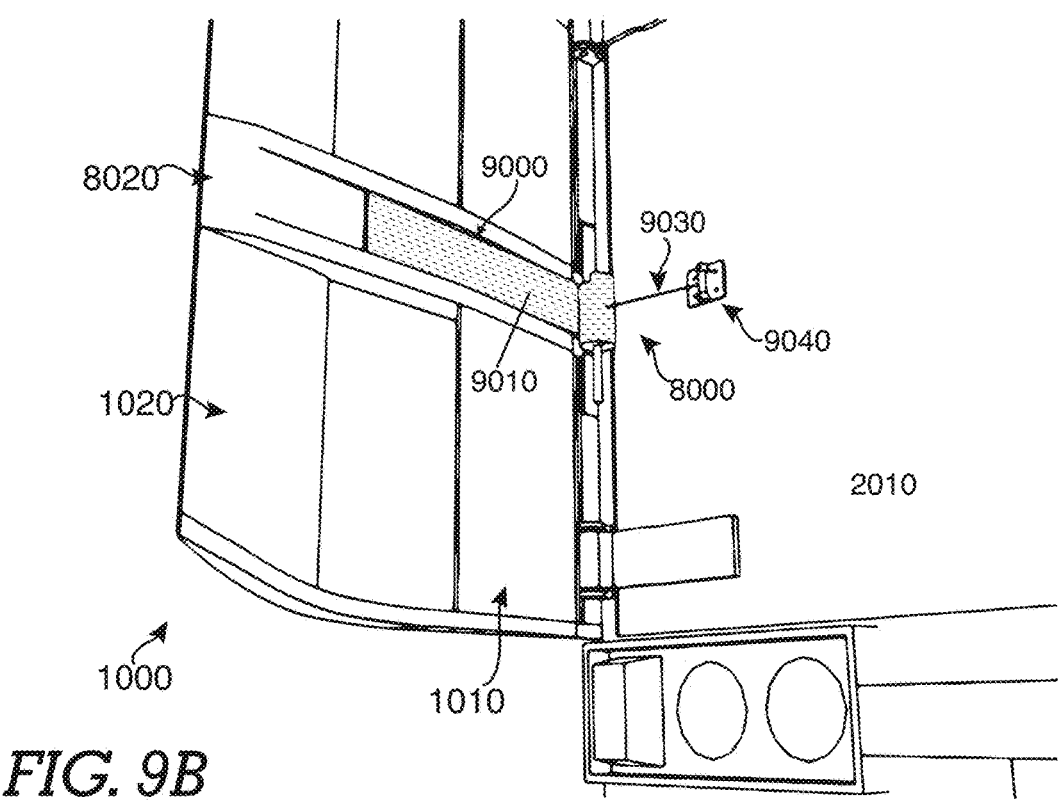
FIG. 9B. Perspective view of a rear portion of a vehicle having a planar form.

In certain embodiments of the invention, as shown in FIG. 9A, comprise an aerodynamic device 1000 with a plurality of mounting stiffeners 8020. Referring to FIG. 9A, it may be so desired to configure a mounting stiffener 8020 with a channel recess 9000 longitudinally along the length on the inward side of the mounting stiffener 8020. Referring to FIG. 9B, the hinged mount 8000 comprises a brace structure 9010 configured to interface with and be affixed within a channel recess 9000 of the mounting stiffeners 8020. Referencing FIG. 8, the rotative positioning provided by the hinged mounts 8000 allow movement of the aerodynamic device 1000 to prevent the aerodynamic device 1000 from interfering with the swing of a door 2010 opening outward. As shown in FIG. 8, it may be desired in certain embodiments for the aerodynamic device 1000 to further comprise clearance notches 8010 configured to allow clearance around a hinged mount 8000, preventing interference between the aerodynamic device 1000 and the hinged mount 8000.

Certain embodiments of an apparatus, referring to FIG. 9B are configured for use with a vehicle 2000 with aft-plane mounted doors 2010 which swing outward. The apparatus comprising an aerodynamic device 1000 and hinged mounts 8000, further comprises a tensile component 9030. The tensile component 9030 provides tensile constraint to the aerodynamic device 1000, maintain a maximum predetermined angular offset from the aft-plane 2070. In such embodiments, a first end of the tensile component 9030 is affixed to an inward facing surface the aerodynamic device 1000 and a second end of the tensile component 9030 is affixed to an anchor component 9040. The anchor component 9040 is affixed to a planar surface such as a door 2010, as may be the case with a semi-trailer. In such embodiments, the aerodynamic device is permitted to rotate outwardly in conjunction with the outward swing of the door 2010 to prevent interference when the door 2010. It may be desired in such embodiments for the hinge mechanism to have an intermediate mechanical stop to prevent the inward rotation of the aerodynamic device beyond the predetermined angular separation from the aft-plane. It may also be desired for the tensile component 9030 to be configured for easy detachment.

Figure 9C:
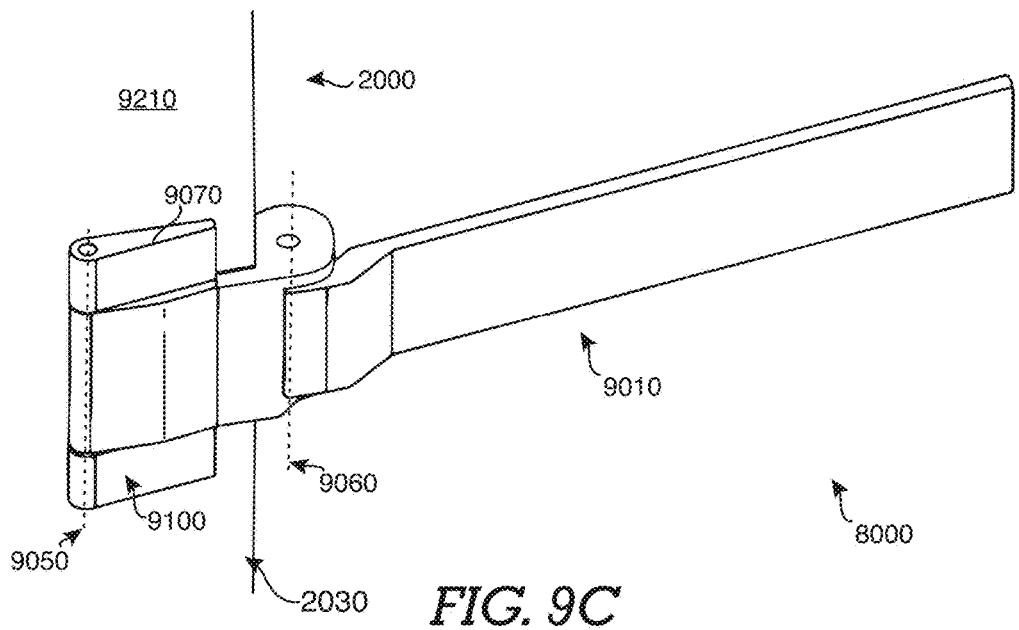
FIG. 9C. Perspective view of a hinge attached to a vehicle in certain embodiments.
Figure 9D:
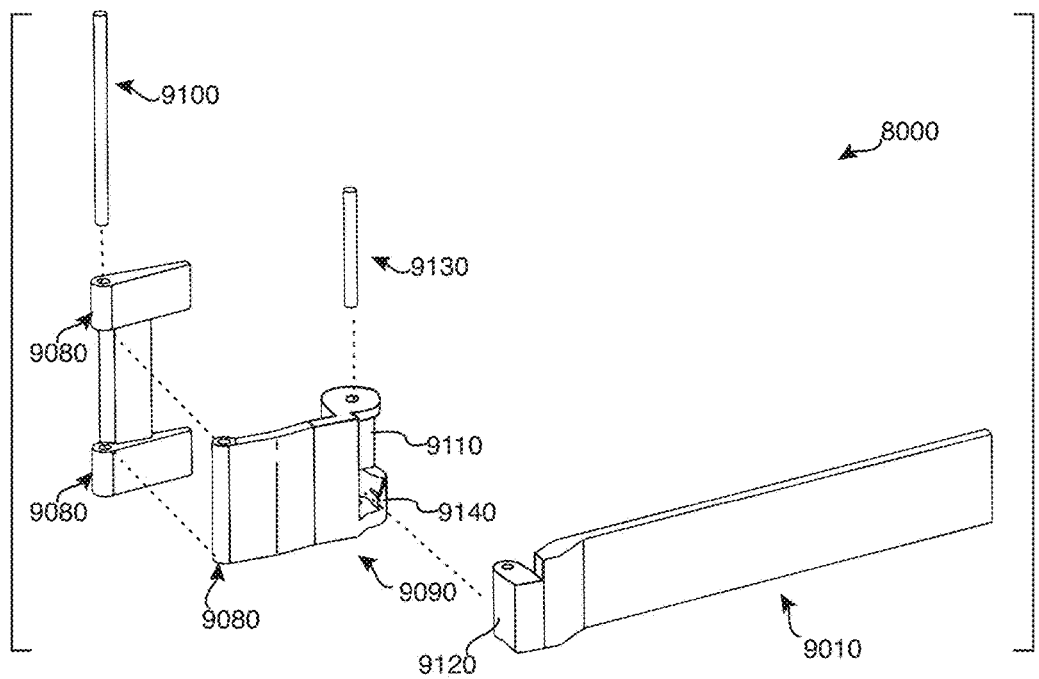
FIG. 9D. Exploded view of a hinge in certain embodiments.

Referring to FIGS. 9C and 9D, certain embodiments of a hinged mount 8000 comprising a brace structure 9010 further comprises a first hinge pivot axis 9050 and a second hinge pivot axis 9060. In such embodiments, a static mount plate 9070 having is attached to an exterior planar surface 4010 of a vehicle 2000, typically proximate to a vertical trailing edge 2030. The static mount plate 9070 has a plurality of hinge knuckles 9080. An intermediate hinge component 9090 having at least one hinge knuckle 9080 at first distal end mates with said static mount plates 9070 having first and second hinge knuckles 9080. The hinge knuckle 9080 of the intermediate hinge component 9090 is configured to interface between the hinge knuckles 9080 of the static mount plate 9070 aligning the hinge knuckles. This alignment of hinge knuckles 9080 allows a first pin component 9100 to be disposed through the aligned hinge knuckles 9080 to provide axial constraint between the static mount plate 9070 and the intermediate hinge component 9090 along the first hinge pivot axis 9060. The intermediate hinge component 9090 has a receiving feature 9110 at a second distal end configured to receive a mating feature at a first distal end of the brace structure 9010. In such embodiments the mating feature of the brace structure 9010 comprises a brace structure knuckle 9120. The brace structure knuckle 9120 and receiving feature 9110 each have a through-hole of equal diameter configured to align with the second hinge pivot axis 9060. The alignment of the through-holes along the second hinge pivot axis 9060 allows the insertion of a second pin component 9130 to provide axial constraint between the intermediate hinge component 9090 and the brace structure 9010.

Certain embodiments of the referring again to FIG. 9D, the receiving feature 9110 of the intermediate hinge component 9090 further comprises a mechanical stop 9140. The presence of the mechanical stop 9130 prevents axial rotation inward toward the vehicle 2000. However, the lifting of the brace structure 9010 allows the bypassing of the mechanical stop 9140. In embodiments where the brace structure 9010 is affixed to an aerodynamic device for the attachment to a vehicle, this allows a user to store the aerodynamic device against the aft-plane of the vehicle 2000.

Figure 10:
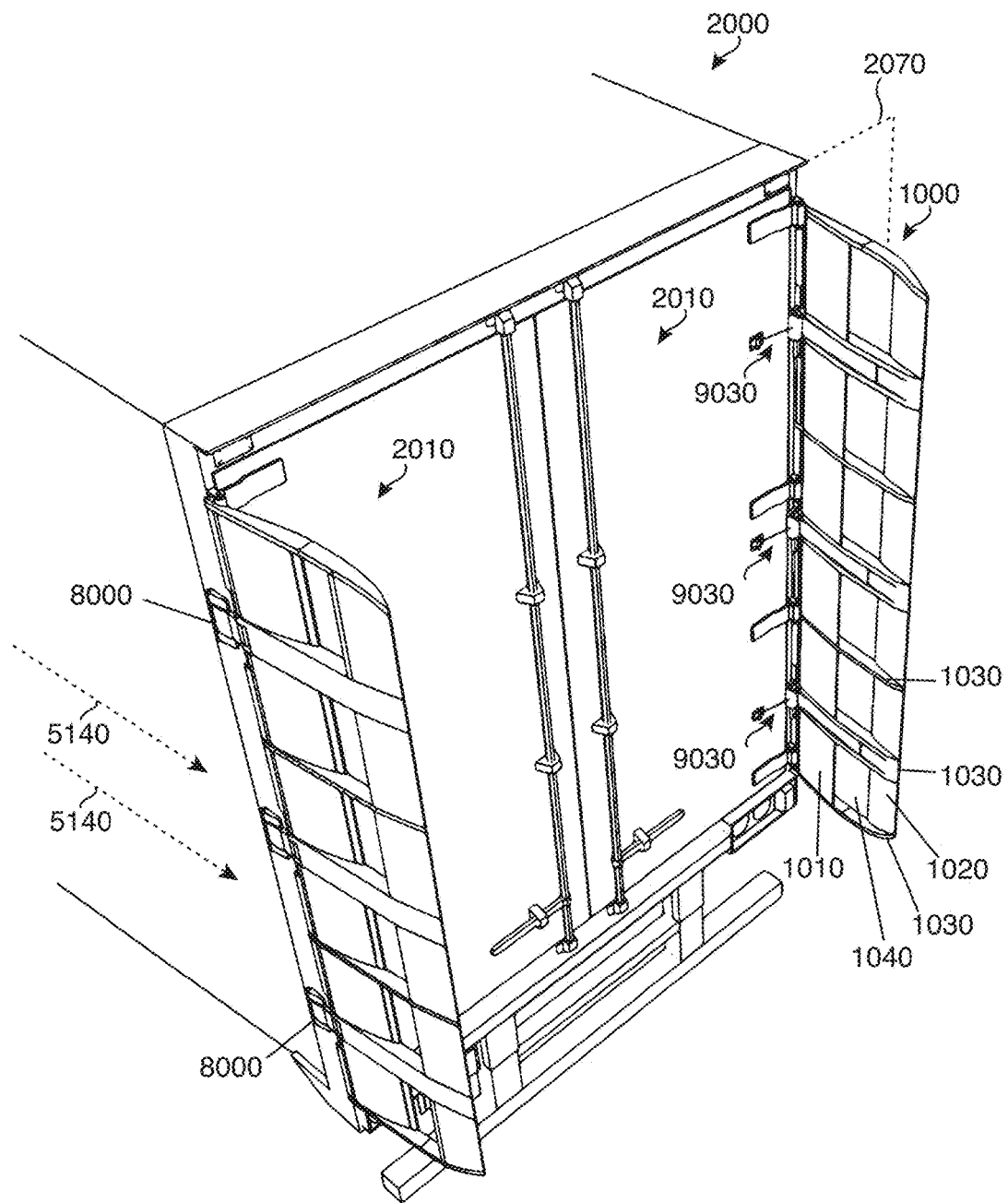
FIG. 10. Perspective view of a planar form attached to a vehicle in certain embodiments.

In certain embodiments of the invention, as shown in FIG. 10, comprise a system for the aerodynamic improvement of a vehicle such as a semi-trailer. Such embodiments comprise a plurality of aerodynamic devices 1000, each attached to the vehicle 2000 in proximity to the aft-plane of the vehicle. The aerodynamic devices 1000 are configured to interact with airflow 5140 surrounding the vehicle associated with the forward travel of the vehicle. The aerodynamic devices further comprise an airfoil 1010, a stabilizer 1020, a plurality of stiffeners 1030 and a plurality of apertures 1040. Certain embodiments of the invention dispose the aerodynamic devices 1000 parallel with the general direction of airflow 5140 along the vehicle 2000 while alternate embodiments dispose the aerodynamic devices 1000 at a device offset angle 4020 from the direction of airflow 5140. In certain alternative embodiments, the aerodynamic devices 1000 are disposed at a device offset angle 4020 of 7-degrees inward toward the vehicle 2000. The plurality of aerodynamic devices 1000 affixed to the vehicle 2000 using a hinged mechanism 8000 allows the rotative repositioning of the aerodynamic devices 1000 in relation to the vehicle 2000 to prevent interference with such operations as the opening of a door 2010. The system further comprises a plurality of tensile components 9030 affixed between each aerodynamic device 1000 and to maintain an angular separation from the aft-plane 2070 of the vehicle 2000 when the doors 2010.

It will be appreciated to those skilled in the art that the fixation of the apparatus or system as disclosed herein need not be affixed in a hinged manner and one or more aerodynamic devices 1000 may be statically affixed to the vehicle.

Figure 11:
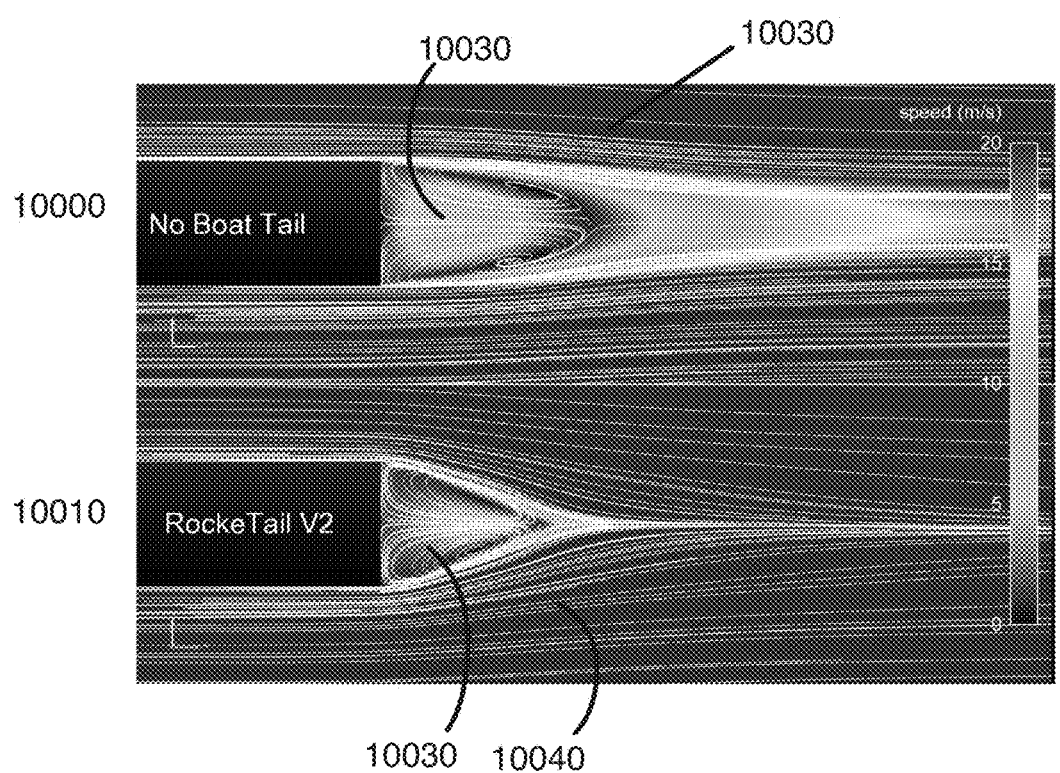
FIG. 11. Simulation results comparing an embodiment of the present invention to a reference vehicle without aerodynamic improvements.

As shown in FIG. 11, comparative simulations were conducted in accordance with SAE J1252 testing protocol. The comparative test surrounded two vehicles: A baseline truck 10000 and a test truck 10010. The baseline truck 10000 is equipped with a standard tractor and 53 ft trailer with no aerodynamic improvements. The test truck 10010 is equipped with a standard semi-truck and 53 foot semi-trailer with a certain embodiment of the aerodynamic device as discussed herein. The tapering of flow dynamics as shown behind the test truck 10010 demonstrates more efficient conversion from turbulent flow 10030 to a laminar flow 10040 pattern trailing the semi-trailer than that of the reference truck 10000. The more efficient conversion to laminar flow 10040 translates into lower pressure differentials and mitigated turbulent flow characteristics, which are factors associated with improving aerodynamic efficiency.

Figure 12A:
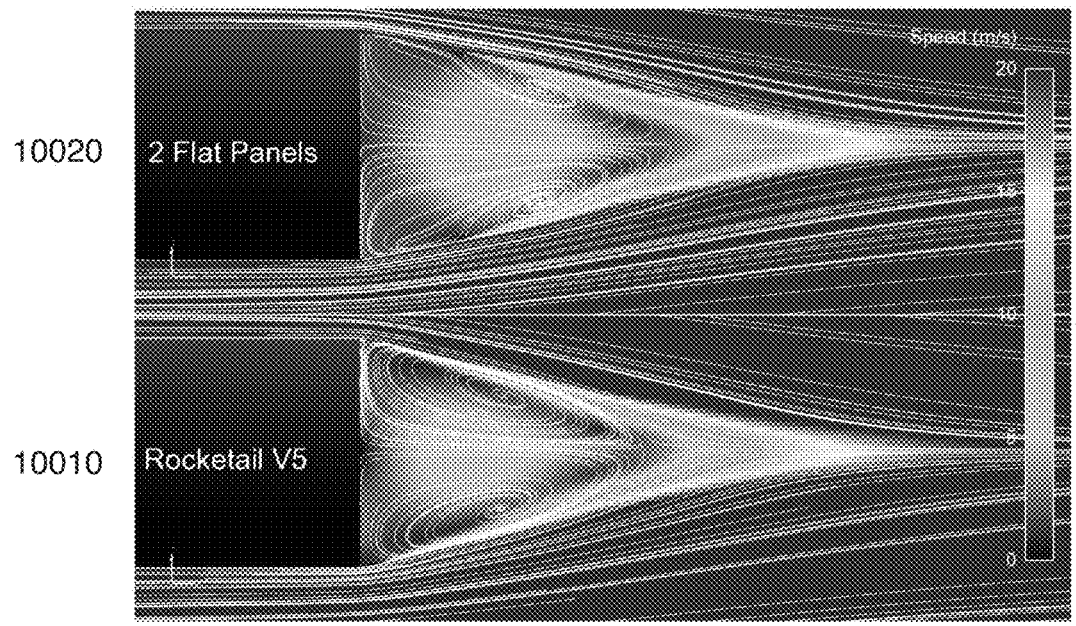
FIG. 12A. Simulation results comparing an embodiment of the present invention to a reference vehicle with oversized flat panels.
Figure 12B:
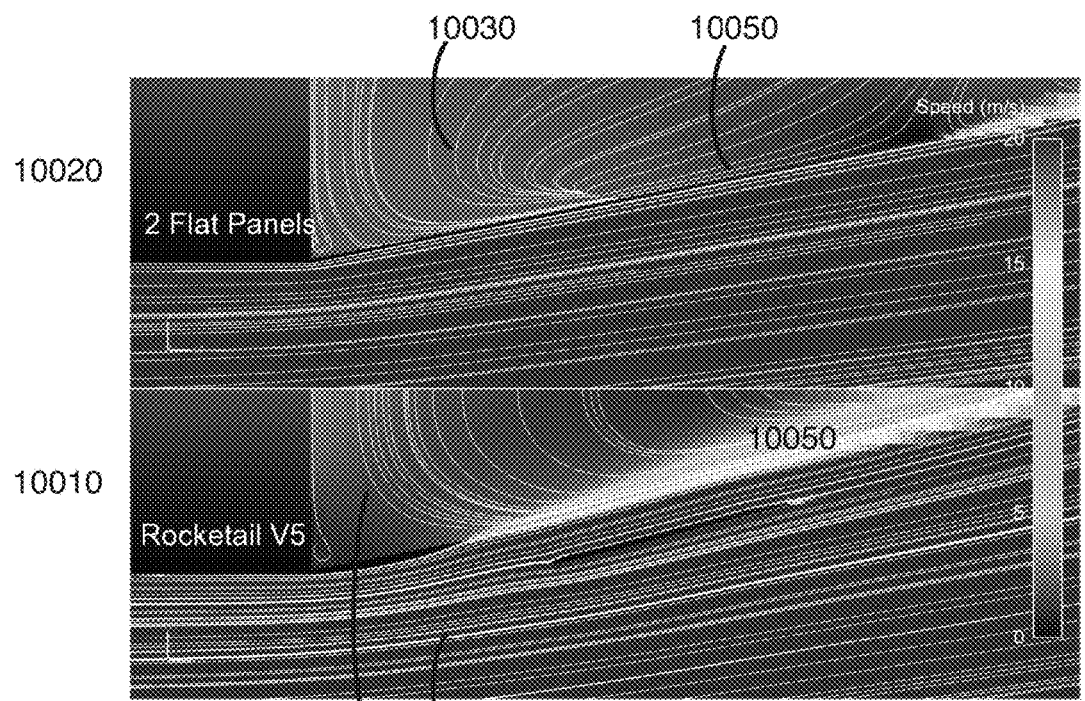
FIG. 12B. Close-up view of simulation results shown in FIG. 12A.

As shown in FIG. 12A, comparative simulations were conducted in accordance with SAE J1252 testing protocol. The comparative test surrounded two vehicles: A reference truck 10020 and a test truck 10010. The reference truck 10020 is equipped with a standard tractor and 53 ft trailer with aerodynamic improvements comprising two flat panels mounted at the vertical trailing edges of the reference truck 10020 extending rearward 4 feet and having an optimal angle of attack of 11-degrees inward toward the semi-trailer (Salari, Kambiz DOE's Effort to Improve Heavy Vehicle Aerodynamics through Joint Experiments and Computations. Lawrence Livermore Laboratory, 2013. LLNL-PRES-629672). The test truck 10010 is equipped with a standard semi-truck and 53 foot semi-trailer with a certain embodiment of the aerodynamic device as discussed herein extending away from the semi-trailer rearward 27 inches and having an angle of attack of 7-degrees inward toward the semi-trailer. As shown, the efficiency of conversion to laminar flow 10040 between the reference truck 10020 and the test truck 10010 are similar despite the aerodynamic device extending rearward less than half the distance than that of the flat panels of the reference truck 10020. As shown in FIG. 12b, upon closer inspection of boundary region 10050 between the laminar flow 10040 and the turbulent flow 10030, it is apparent that the flow dynamics show less turbulent flow 10030 in the case of the test truck 10010 due to pressure equalization provided by airflow redirection.

It will be appreciated that any combination of the elements discussed herein in the configuration of a apparatus for the aerodynamic improvement of a vehicle may be configured according to the vehicle of application and may be reconfigured accordingly with respect to scale, proportion and configuration while comprising the inventive elements of the apparatus as discussed herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "proximal," "distal," etc., as used herein, are intended for illustrative purposes only and do not limit the embodiments in any way. Additionally, the term "plurality," as used herein, indicates any number greater than one, either disjunctively or conjunctively, as necessary, up to an infinite number. The benefits, advantages, solutions to problems, and any element(s) that may cause any benefit, advantage, or solution to occur or become more pronounced are not to be construed as a critical, required, or essential features or elements of any or all the claims.

What is claimed is:

1. An apparatus for the improvement of vehicle aerodynamics comprising:
    mounting features;
    an airfoil and a stabilizer, said airfoil and stabilizer separated by a predetermined distance and interconnected by a plurality of stiffeners;
    said plurality of stiffeners being offset from each other;
    an aperture defined by a trailing edge of said airfoil, a leading edge of said stabilizer, a first stiffener and a second stiffener; and
    said mounting features configured to affix to an external surface of a ground vehicle with a leading edge of said airfoil proximate to said external surface.

2. The apparatus of claim 1 wherein said second edge of said airfoil further comprises an edge for mating with the trailing vertical edge of said ground vehicle.

3. The apparatus of claim 1 wherein at least two of said stiffeners are mounting stiffeners, allowing for the fixation of mounting features.

4. The stiffeners of claim 1 wherein at least two of said stiffeners are mounting stiffeners, said mounting stiffeners further comprising a channel recess.

5. The apparatus of claim 1, wherein said mounting features further comprise hinged mounts for hinged fixation to said ground vehicle.

6. The apparatus of claim 5 further comprising a tensile component affixed to said aerodynamic device, said tensile component having a first end affixed to said aerodynamic device and a second end affixed to the aft-plane of said ground vehicle; wherein said tensile component maintains a maximum angle of separation between said aerodynamic device and said aft-plane of said ground vehicle.

7. The apparatus of claim 1 wherein said apparatus extends rearward from an aft-plane of said ground vehicle.

8. A system for the improvement of vehicle aerodynamics comprising:
    a first aerodynamic device having mounting features, said first aerodynamic device further comprising an airfoil and a stabilizer;
    a second aerodynamic device having mounting features;
    said second aerodynamic device further comprising an airfoil and a stabilizer;
    said airfoil and stabilizer of said first aerodynamic device separated by a predetermined distance and interconnected by a plurality of stiffeners;
    said plurality of stiffeners of said first aerodynamic device having an offset from each other;
    an aperture defined by a trailing edge of said airfoil of said first aerodynamic device, a leading edge of said stabilizer of said first aerodynamic device, a first stiffener of said first aerodynamic device and a second stiffener of said first aerodynamic device;
    said airfoil and stabilizer of said second aerodynamic device separated by a predetermined distance and interconnected by a plurality of stiffeners;
    said plurality of stiffeners of said second aerodynamic device being offset from each other;
    an aperture defined by a trailing edge of said airfoil of said second aerodynamic device, a leading edge of said stabilizer of said second aerodynamic device, a first stiffener of said second aerodynamic device and a second stiffener of said second aerodynamic device;
    said first aerodynamic device configured to affix to a first external surface of a ground vehicle with a portion of said airfoil of said first aerodynamic device proximate to said first external surface with said first aerodynamic device extending rearward from an aft-plane of said ground vehicle; and
    said second aerodynamic device configured to affix to a second external surface of said ground vehicle with a portion of said airfoil of said second aerodynamic device proximate to said second external surface with said second aerodynamic device extending rearward from said aft-plane of said ground vehicle.

9. The system of claim 8 wherein said mounting features further comprise hinged mounts.

10. The system of claim 8 wherein said first aerodynamic device further comprises a first tensile component affixed to said first aerodynamic device, said first tensile component having a first end affixed to said aerodynamic device and a second end affixed to the aft-plane of said ground vehicle; and said second aerodynamic device further comprising a second tensile component affixed to said first aerodynamic device, said second tensile component having a first end affixed to said second aerodynamic device and a second end affixed to the aft-plane of said ground vehicle;

wherein said first tensile component is configured to maintain a maximum predetermined device offset angle between said first aerodynamic device and said aft-plane of said ground vehicle and said second tensile component is configured to maintain a maximum predetermined device offset angle between said second aerodynamic device and said aft-plane of said ground vehicle.

* * * * *